(12) United States Patent
Cheung

(10) Patent No.: US 8,263,922 B2
(45) Date of Patent: Sep. 11, 2012

(54) IMAGE SENSOR

(75) Inventor: Desmond Cheung, Grand Cayman (KY)

(73) Assignee: Himax Imaging, Inc., Grand Cayman (KY)

( * ) Notice: Subject to any disclaimer, the term of this patent is extended or adjusted under 35 U.S.C. 154(b) by 310 days.

(21) Appl. No.: 12/638,965

(22) Filed: Dec. 15, 2009

(65) Prior Publication Data

US 2011/0139968 A1 Jun. 16, 2011

(51) Int. Cl.
*H01L 27/00* (2006.01)

(52) U.S. Cl. ........................ 250/208.1; 250/216; 257/435

(58) Field of Classification Search .................. 250/216, 250/208.1; 257/435
See application file for complete search history.

(56) References Cited

U.S. PATENT DOCUMENTS

| | | | |
|---|---|---|---|
| 2005/0185080 A1* | 8/2005 | Nishimura et al. | 348/311 |
| 2005/0248675 A1* | 11/2005 | Hashimoto et al. | 348/308 |
| 2009/0065821 A1* | 3/2009 | Lee | 257/292 |

* cited by examiner

*Primary Examiner* — Georgia Y Epps
*Assistant Examiner* — Kevin Wyatt
(74) *Attorney, Agent, or Firm* — Winston Hsu; Scott Margo

(57) ABSTRACT

The present invention provides an image sensor. The image sensor comprises a plurality of pixels. Each pixel comprises an optical element and at least a dummy metal segment disposed above the optical element, wherein the dummy metal segment is not directly above the optical element. The image sensor includes a dummy metal segment with a size different from a size of another dummy metal segment included in the image sensor.

5 Claims, 3 Drawing Sheets

IMAGE SENSOR

BACKGROUND OF THE INVENTION

1. Field of the Invention

The present invention relates to an image sensor, and more particularly, to an image sensor which is capable of avoiding light shielding and minimizing hue shift.

2. Description of the Prior Art

Please refer to FIG. 1. FIG. 1 shows a simplified diagram of a conventional image sensor 100. As shown in FIG. 1, the image sensor 100 comprises: pixels 110, 120, 130, and a module lens 140 positioned above the pixels 110, 120, 130. The pixel 110 comprises a photodiode 112 and two dummy metal segments 114. The pixel 120 comprises a photodiode 122 and two dummy metal segments 124. The pixel 130 comprises a photodiode 132 and two dummy metal segments 134. The dummy metal segments 114, 124, 134 are utilized for achieving symmetry for the pixels 110, 120, 130, respectively. However, due to larger chief ray angle (CRA) for the pixels 120, 130 near the edges of the pixel array, light is partially shielded by the dummy metal segments 124, 134, respectively. CRA will be larger when height of the image sensor 100 is further reduced, and the light shielding problem becomes more serious. In addition, hue shift can still exist due to asymmetry of the photodiode or polysilicon shape in the image sensor 100.

Please refer to FIG. 2. FIG. 2 shows a simplified diagram of another conventional image sensor 200 disclosed in U.S. Pat. No. 7,214,920. As shown in FIG. 2, the image sensor 200 comprises: pixels 210, 220, 230, and a light source 240. The pixel 210 comprises a photodiode 212 and two dummy metal segments 214. The pixel 220 comprises a photodiode 222 and two dummy metal segments 224. The pixel 230 comprises a photodiode 232 and two dummy metal segments 234. The light shielding problem is minimized by spatially varied dummy metal segments as shown in FIG. 2, and this variation is made progressively from the center to the edges of the pixel array. However, the metal route positions have to be changed for the variation.

SUMMARY OF THE INVENTION

It is therefore one of the objectives of the present invention to provide an image sensor which is capable of avoiding light shielding and minimizing hue shift, so as to solve the above problem.

According to an embodiment of the present invention, an image sensor is disclosed. The image sensor comprises a plurality of pixels. Each pixel comprises an optical element and at least a dummy metal segment disposed above the optical element, wherein the dummy metal segment is not directly above the optical element. The image sensor includes a dummy metal segment with a size different from a size of another dummy metal segment included in the image sensor.

Briefly summarized, the image sensor of the present invention can solve the light shielding problem and minimize the hue shift problem.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . .".

Figure 1:
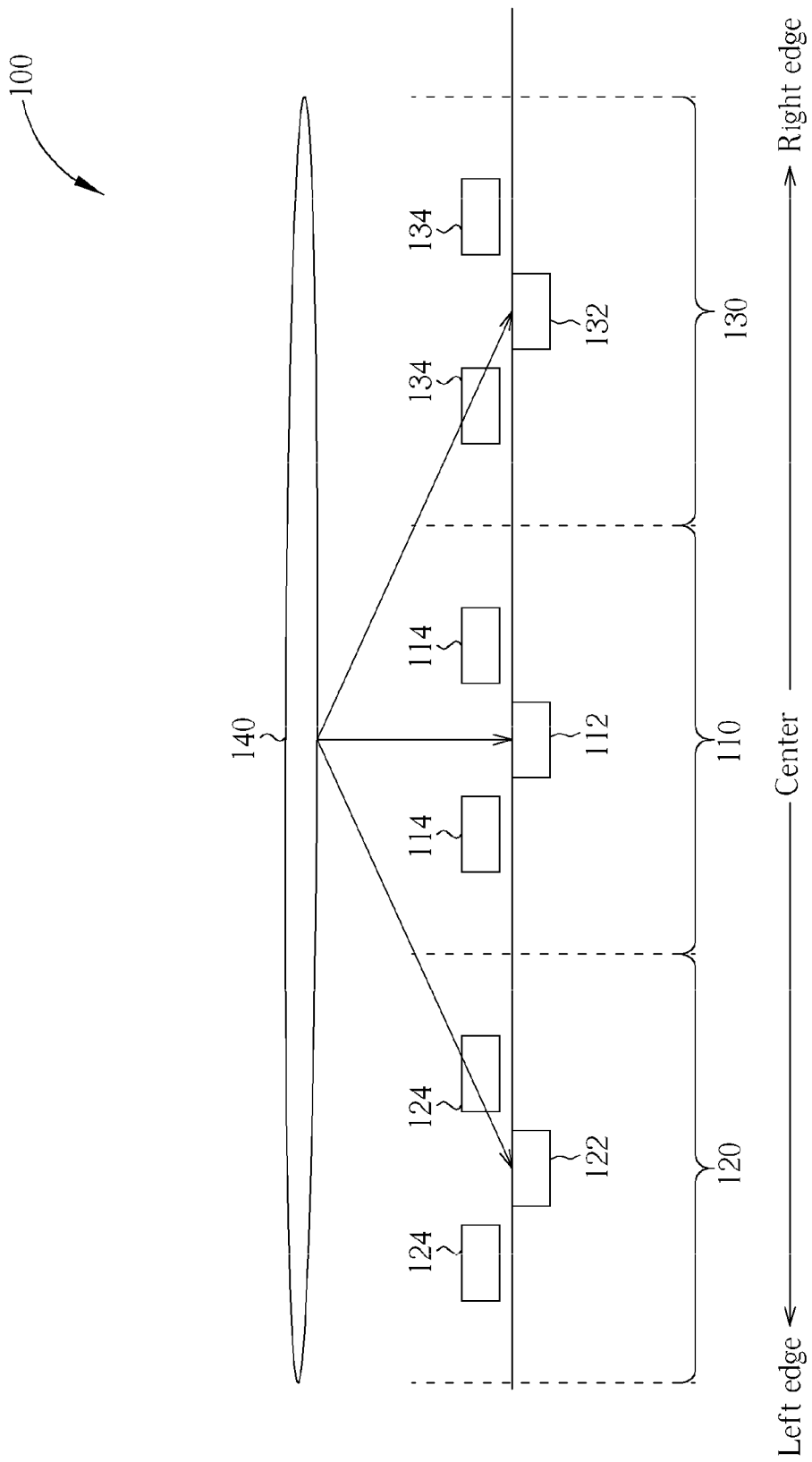
FIG. 1 shows a simplified diagram of a conventional image sensor.
Figure 2:
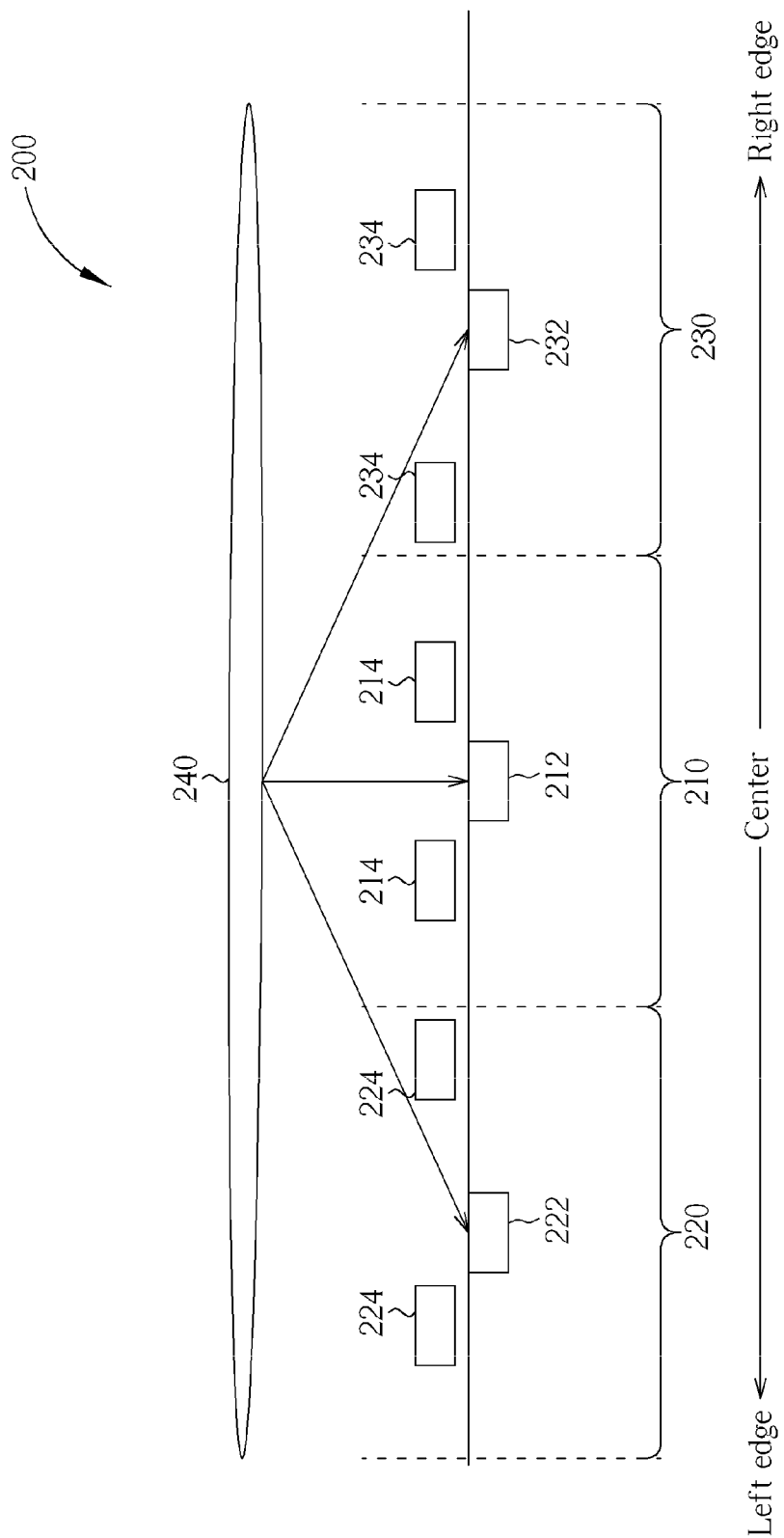
FIG. 2 shows a simplified diagram of another conventional image sensor
Figure 3:
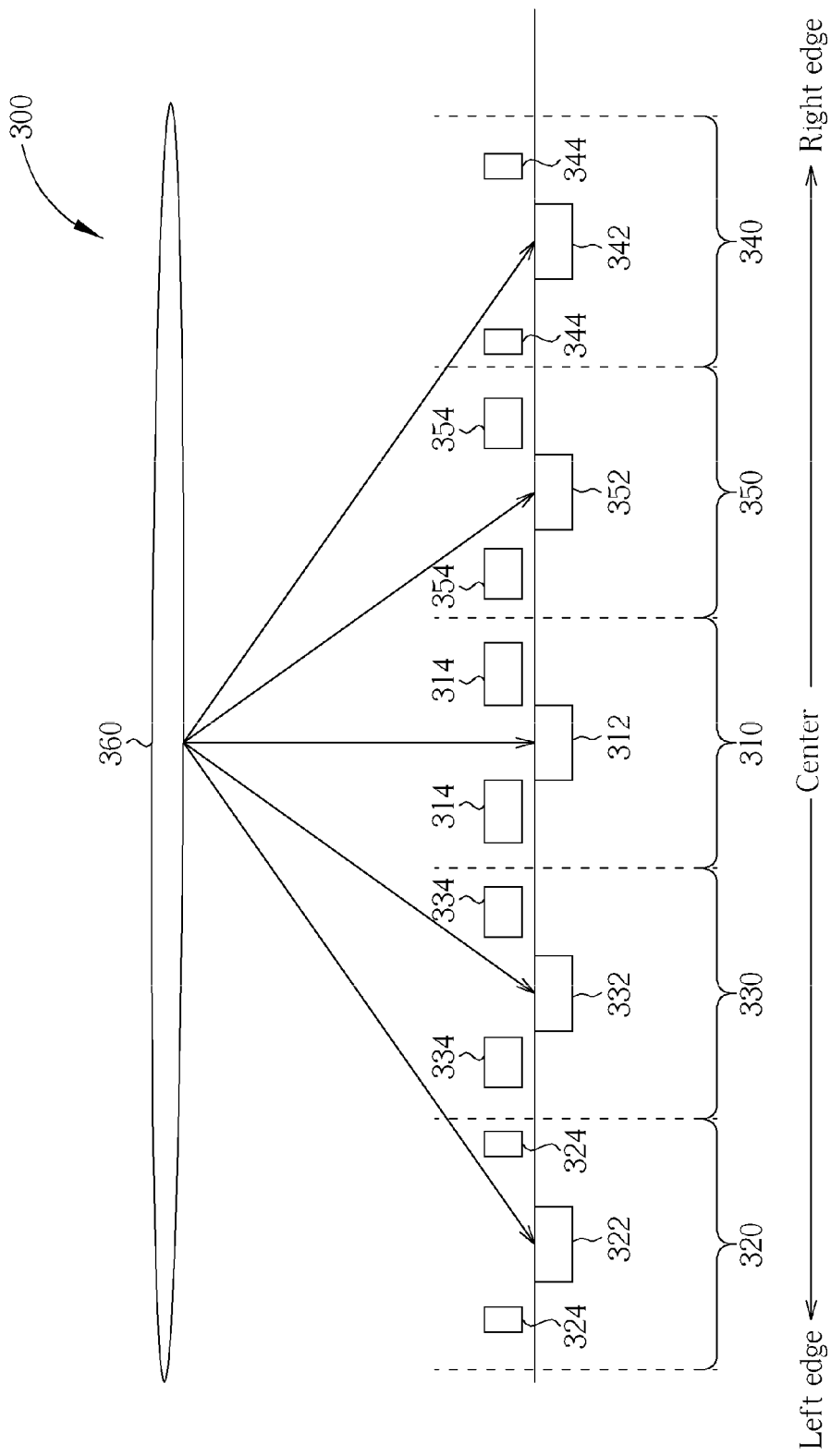
FIG. 3 shows a simplified diagram of an image sensor according to an embodiment of the present invention.

Please refer to FIG. 3. FIG. 3 shows a simplified diagram of an image sensor 300 according to an embodiment of the present invention. As shown in FIG. 3, the image sensor 300 comprises: pixels 310, 320, 330, 340, 350, and a module lens 360 positioned above the pixels 310, 320, 330, 340, 350. The pixel 310 comprises an optical element 312 and two dummy metal segments 314. The pixel 320 comprises an optical element 322 and two dummy metal segments 324. The pixel 330 comprises an optical element 332 and two dummy metal segments 334. The pixel 340 comprises an optical element 342 and two dummy metal segments 344. The pixel 350 comprises an optical element 352 and two dummy metal segments 354. The optical elements 312, 322, 332, 342, and 352 can be photodiodes. The image sensor 300 can be a complementary metal-oxide semiconductor (CMOS) image sensor.

In order to solve the light shielding problem, the dummy metal segments 334, 354 are smaller than the dummy metal segments 314, and the dummy metal segments 334 are equal to the dummy metal segments 354. The dummy metal segments 324, 344 are smaller than the dummy metal segments 334, 354, and the dummy metal segments 324 are equal to the dummy metal segments 344. In other words, the light shielding problem is solved by modifying the size of the dummy metal segments, and this modification is made progressively from the center to the edges of the pixel array. Similarly, pixels of different colors can be treated in the same way to have the same local response, and thus hue shift can be minimized.

Briefly summarized, the image sensor 300 of the present invention can solve the light shielding problem and minimize the hue shift problem.

Those skilled in the art will readily observe that numerous modifications and alterations of the device and method may be made while retaining the teachings of the invention.

What is claimed is:

1. An image sensor, comprising:
   a plurality of pixels, each comprising:
      an optical element; and
      at least a dummy metal segment, disposed above the optical element, wherein the dummy metal segment is not directly above the optical element;
      wherein the image sensor includes a dummy metal segment with a size different from a size of another dummy metal segment included in the image sensor, the pixels include a first pixel, a second pixel at a left side of the first pixel, and a third pixel between the first pixel and the second pixel; a first optical element included in the first pixel is disposed at an optical center of the image sensor; a third dummy metal segment included in the third pixel is smaller than a first dummy metal segment included in the first pixel; and a second dummy metal segment included in the second pixel is smaller than the third dummy metal segment included in the third pixel.

2. The image sensor of claim 1, wherein the pixels further include a fourth pixel at a right side of the first pixel, and a fifth pixel between the first pixel and the fourth pixel; a fourth dummy metal segment included in the fourth pixel is equal to the second dummy metal segment included in the second pixel; and a fifth dummy metal segment included in the fifth pixel is equal to the third dummy metal segment included in the third pixel.

3. The image sensor of claim 1, wherein the optical element included in each pixel is a photodiode.

4. The image sensor of claim 1, wherein the image sensor is a complementary metal-oxide semiconductor (CMOS) image sensor.

5. The image sensor of claim 1, further comprising a module lens positioned above the pixels.

* * * * *